Aug. 4, 1942.　　　I. E. COFFEY　　　2,291,881
SPEED CONTROL VALVE
Filed March 31, 1939

IRVEN E. COFFEY
*INVENTOR.*

BY

*ATTORNEY.*

Patented Aug. 4, 1942

2,291,881

UNITED STATES PATENT OFFICE 2,291,881

SPEED CONTROL VALVE

Irven E. Coffey, Normandy, Mo., assignor to Carter Carburetor Corporation, St. Louis, Mo., a corporation of Delaware Application March 31, 1939, Serial No. 265,169

2 Claims. (Cl. 60—60)

This invention relates to automatic windshield cleaners of the fluid motor type as used on present day automobiles, and more particularly to means for maintaining the constant speed of such cleaner motors by automatically compensating for variations in motor load and available working pressure.

The conventional vacuum operated windshield cleaner, comprising a small fluid motor and one or more cleaner members adapted to move on the windshield, is operable due to a sub-atmospheric pressure existing in the intake manifold of an engine during operation.

It is well known that this sub-atmospheric pressure or partial vacuum varies considerably during normal operation of the automobile. It is also true that the load on the cleaner motor or resistance to moving the wiper members on the windshield will vary, as between a slightly wet and a well wetted windshield, or as between a well wetted windshield and one rather heavily covered with snow.

As it is desirable to maintain a reasonably constant speed of the cleaner motor and wiper elements as predetermined by the operator, it will be seen that compensating means for these variables is required.

It is an object of this invention to provide a speed control device for windshield cleaner motors in which the vacuum or suction applied to the cleaner motor having been reduced below the available suction in the intake manifold by predetermined throttling will, upon an increase of vacuum in the intake manifold, automatically increase said throttling and upon a loss of vacuum in the intake manifold decrease said throttling.

It is a further object of this invention to provide a device of the above character in which the suction applied to the cleaner motor having been reduced below the available suction by predetermined throttling will, upon an increased load on the cleaner motor, automatically decrease said throttling and upon a decrease in load, increase said throttling.

Another object of this invention is to provide a generally new and improved device of the above character whereby compensation for variations in load and manifold vacuum may be effected at any point as predetermined within the range of the device, and thereby within those limits maintain a substantially constant speed.

Other objects and advantages will appear in the following specification and accompanying drawing in which.

Figure 1:
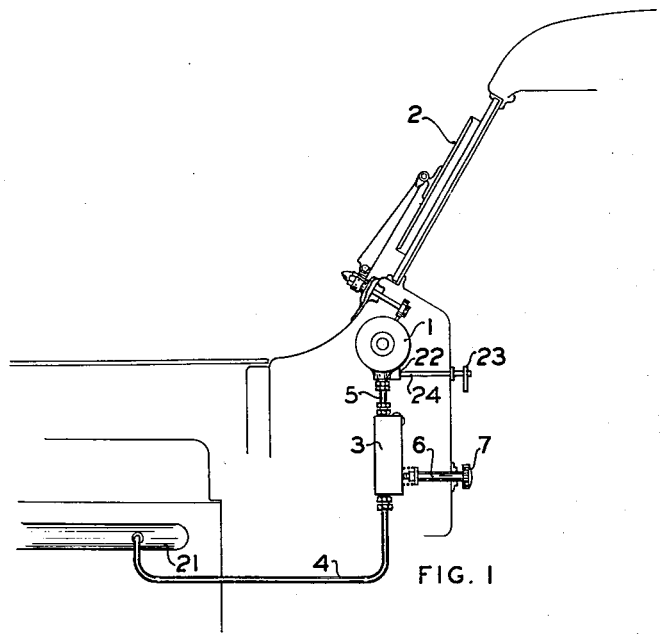
Fig. 1 is a diagrammatic view in which a portion of the upper fore end of a current automobile is outlined having an embodiment of my invention arranged therewith.
Figure 2:
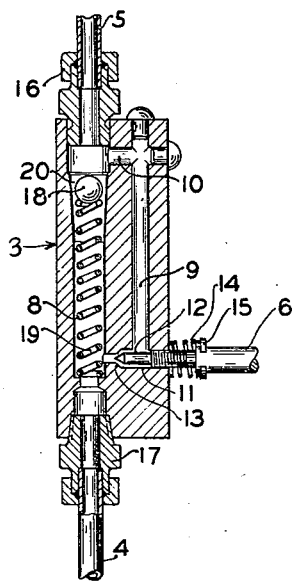
Fig. 2 is a longitudinal section through the speed control valve constructed in accordance with my invention. This view shows the pressure responsive valve in its least restricting position.
Figure 3:
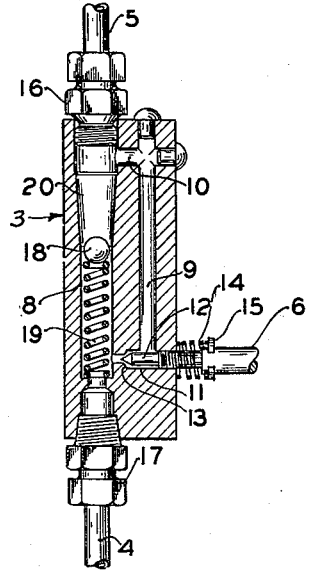
Fig. 3 is also a longitudinal section through the speed control valve. This view shows the automatic valve in its most restricting position.

The windshield cleaner according to my invention comprises a conventional vacuum operated motor indicated by numeral 1, a wiping element 2 being operated through suitable linkage thereby and pivotally mounted in any suitable manner and adapted to be moved on the windshield. The cleaner motor is equipped with an "on" and "off" valve 22 arranged to be operated manually from the dash by means of operating handle 23 and valve rod 24.

A speed control valve 3 on the suction side of the motor 1 and arranged in series with the suction conduit 4 is shown attached to the cleaner motor by the short nipple 5 which forms a part of the suction conduit.

I have shown the speed control valve as a detachable unit in this modification, which permits the manual control valve rod 6 and operating handle 7 to be disposed for convenient operation without regard to the disposition of the cleaner motor. However, it will be understood that the speed control valve mechanism may, for structural economy or any other reason be enclosed in a casing formed integral with the cleaner motor cylinder.

The speed control valve comprises a main body member 3 having two longitudinal parallel passages 8 and 9. The lower portion of passage 8 is straight bored while the upper portion is taper bored as indicated at 20.

Communication near the upper end of these passages is effected by the cross passage 10 and near the lower end by the cross passage 11.

A threadedly engaged valve member 12 adapted to engage the tapered seat 13 and having an extension 6 and operating handle 7 arranged for convenient manual operation from the dash is provided.

A spring 14 bearing on the main body member 3 and on the C disk 15 is provided to increase friction between the screw threads which prevents movement of the valve 12 due to vibration.

The longitudinal passage 8 is adapted to receive threaded means 16 for attaching nipple 5 at its upper end and is similarly arranged to receive threaded means 17 for attaching conduit 4 at its lower end.

A ball valve 18 supported and normally urged upward by the calibrated spring 19 functions to variably restrict passage 8 as it moves vertically in the tapered portion 20 of passage 8. The rate of spring 8, the diameter of ball 18, and the diameter and taper of bore 8 at 20, are so calibrated that when passage 13 is approximately half open and the manifold vacuum at a mean selected for this calibration, the ball 18 will rest at a point approximately midway of its control range in taper 20 and the flow through the instrument under these conditions will result in an optimum motor speed.

In operation, assume the engine is running and an ample source of suction is available in the intake manifold. When the valve 22 is moved to an "on" position, the cleaner motor will be in communication with the intake manifold 21 by reason of conduit 5, passage 8, conduit 4, and the by-pass passages 9, 10, and 11 if the manual speed control valve 12 is not in engagement with valve seat 13.

The cleaner motor will now operate at a speed determined by the position of valve 12 with respect to seat 13.

If the manually controlled valve 12 has been adjusted to engage valve seat 13 thereby closing the by-pass, substantially the minimum speed of the cleaner motor will result. Assuming a speed has been selected by adjustment of valve 12, if then the cleaner motor is operating under a mean load and the manifold vacuum is also at the mean selected in calibrating the instrument, the ball 18 will balance at a position midway of its control range in tapered portion 20. If now the vacuum in conduit 4 is increased due to increased manifold vacuum, the differential acting on ball 18 will be increased and as a result the ball 18 will move downward to some more restricting position whereby the selected speed will be maintained.

If instead in the above instance the suction in conduit 4 is reduced due to a drop in manifold vacuum, the pressure differential on opposite sides of the ball valve 18 will be reduced permitting the spring 19 to urge the ball upward in the tapered portion of passage 8 to some position wherein the additional annular area around the ball valve will permit, with reduced manifold suction the continued selected speed.

If, however, we assume that the suction in the intake manifold has remained constant in the above instance, but that an added load on the cleaner motor is applied, as would occur if a substantial amount of snow fell upon the windshield, it will be seen that this would tend to slow down the cleaner motor. The flow through the motor would then be reduced.

This added resistance would, obviously, lower the pressure on the cleaner motor side of ball valve 18 and as the pressure has remained constant on the intake manifold side, the result would again be a reduction in pressure differential on opposite sides of ball valve 18.

This would again permit valve 18 to move upward to some position wherein the additional annular area around the ball valve would permit a sufficiently greater suction to act on the fluid motor to maintain the predetermined wiper speed with the increased load.

The adjustment of valve 12 will vary the total flow through the instrument to vary the speed of the cleaner motor, but will not affect the position of ball 18, this element being responsive only to cleaner load or manifold vacuum change. It is to be understood that the proportion of conduit 4 with relation to passage 13 and the capacity of the vacuum pump (the engine) are such that regulation of valve 13 will not appreciably affect the differential acting on ball 18.

The exclusive use of all modifications as come within the scope of the appended claims is contemplated.

I claim:

1. In combination, a windshield cleaning mechanism comprising a fluid motor, a conduit from said fluid motor to a source of actuating vacuum, a speed control device interposed in said conduit and including a body member having a passageway in the line of flow between said motor and said source of vacuum, said passageway including a tapered portion with its larger end towards said fluid motor, a valve member arranged for movement in said tapered portion in response to differential pressures, said valve member being subjected at one side to the vacuum at said source and at the other side to the pressures in said fluid motor, whereby said valve member will respond to differential pressures created by variations of the load on the fluid motor and variations in the vacuum at said source to control the area of said passageway, and thereby maintain substantially constant speed operation of the fluid motor.

2. In combination, a windshield cleaning mechanism, comprising a fluid motor, a conduit from said fluid motor to a source of actuating vacuum, a speed control device interposed in said conduit and including a body member having a passageway in the line of flow between said motor and said source of vacuum, said passageway including a tapered portion with its larger end towards said fluid motor, a valve member arranged for movement in said tapered portion in response to differential pressures, a spring in said passageway normally urging said valve member in the direction of said fluid motor, said valve member being subjected at one end to the vacuum at said source and at the other end to the pressure in said fluid motor, whereby said valve member will respond to variations of the load on the fluid motor and variations in the vacuum at said source to control the area of said passageway and thereby maintain substantially constant speed operation of the fluid motor, a by-pass around said tapered portion, and a control to adjust the effective cross section of said by-pass.

IRVEN E. COFFEY.